Jan. 12, 1926.

G. THALER 1,569,645

FAUCET

Filed August 21, 1922

INVENTOR.
Gustav Thaler
BY M. C. Frank
ATTORNEY

Patented Jan. 12, 1926.

1,569,645

UNITED STATES PATENT OFFICE.

GUSTAV THALER, OF OAKLAND, CALIFORNIA.

FAUCET.

Application filed August 21, 1922. Serial No. 583,220.

*To all whom it may concern:*

Be it known that I, GUSTAV THALER, a citizen of the United States, residing at the city of Oakland, in the county of Alameda and State of California, have invented certain new and useful Improvements in Faucets, of which the following is a specification.

My invention relates to faucets, and more particularly to bibfaucets for general use.

Faucets as now commonly used about the home and in factories, are of a type that requires that the washer thereof shall be renewed and replaced quite frequently because of its wearage. The average housewife or person is generally unfamiliar with faucet construction, so does not know or finds it quite difficult to perform the simple task of replacing a washer. It is common to see faucets dripping or leaking because of faulty washers, and generally a considerable time elapses before the owner decides to call in a plumber to fix the same.

Therefore, the prime object of my invention is to produce a faucet that dispenses with the necessity of replacing washers.

Another object of the invention, is to produce a faucet whose operating handle is adjustable with reference to surrounding objects, such as an adjacent wall for example, so that it can be positioned to suit the operator.

Another object is to produce a faucet of simple construction, and whose parts are easily accessible for inspection.

Other objects and features of construction, will appear in the subjoined description of the accompanying sheet of drawings, illustrating in this instance, my invention as applied to a hose-bib.

Figure 1:
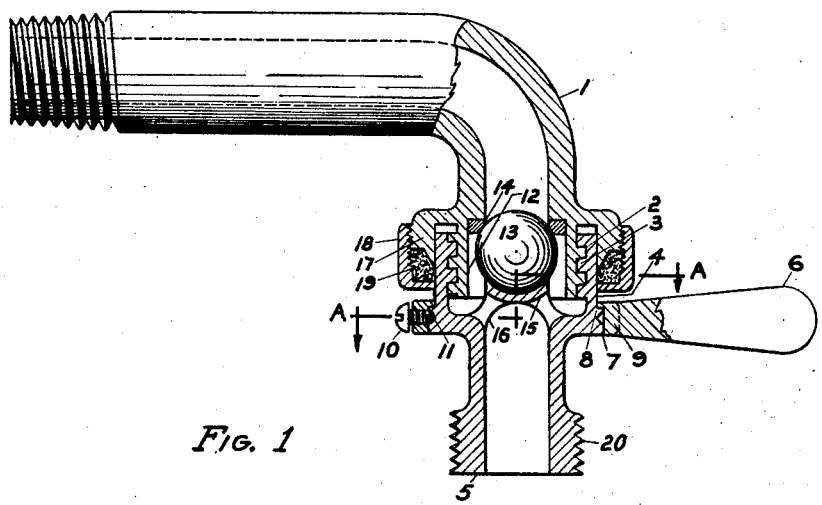
Figure 1 is a partial longitudinal sectional elevation of a faucet containing my invention.
Figure 2:
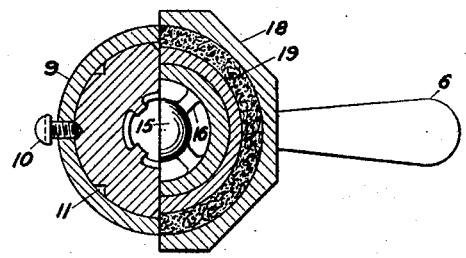
Figure 2 is a cross-section on the line A—A of Figure 1.

Referring to the drawings;—1 represents the body of the faucet, one end of which terminates in a mouth, having usually a square screw-thread 2 on its outer wall. This thread is engaged by the internal thread 3, on an annular flange 4 projecting backwards from the nozzle 5. The rotation of the nozzle, by means of these threads, determines a longitudinal movement of the nozzle member with respect to the body member.

A handle 6 serves to rotate the nozzle member. To support the handle on the nozzle member the latter is provided with a shouldered portion 7, upon which rests a flange 8 projecting inwards from a ring 9 on the handle. The ring is provided with a set-screw 10, by which the handle may be adjusted to, and secured in any desired angular position. If desired, the point of the screw may enter one of a series of notches 11 in the nozzle member, for the better ensuring of the handle and nozzle rotating together.

The mouth of the body member is enlarged into a valve chamber 12, adapted to house a ball-valve 13. The base of the chamber forms a shoulder to seat the ball, or a ring 14 of any suitable material, such as Babbitt metal may form the valve seat.

The ball 13 is of a nonrusting material, such as bronze, for example. It rests on a cupped-chair 15 supported on spider arms 16.

The end of the nozzle, as shown at 20, is threaded for a hose or other connection. When such a nozzle is in use with a hose, a considerable back-pressure develops, caused by the friction of the liquid through the hose. To prevent leakage at the union of the nozzle and body members due to the said back-pressure, I surround the flange 4 by a gland 17 adapted to be engaged by a stuffing box 18. 19 is a packing within the stuffing box to seal the union.

In the case of a direct discharge at the nozzle as when used in a kitchen, no back pressure exists, therefore, the threads 20 may be omitted, also, the members 18 and 19, and the threads on the gland 17.

The ball valve is always free to rotate on its seat and cupped chair, thus, tending to keep itself and those parts true with respect to each other.

In operation, the handle 6 may be angularly adjusted to be free of any adjacent wall or other object, which might otherwise interfere with its movement. When the handle is moved in the opening direction, the nozzle member is rotated, and, because of the threads 2 and 3, the ball 13 lowers from its seat. The liquid then flows over the upper surface of the ball, and impinges against the inner walls of the chamber 12, and from which the liquid is deflected down and between the arms 16, and out through the nozzle. A reverse movement of the handle 6 raises the ball 13 against its seat 14, and cuts off the flow of liquid.

In the drawings, I have shown but one specific form of my invention, but it is to be understood that the invention may be embodied in other different forms, each being a species of my invention, and the patent protection that I desire, is all of that which comes within the spirit and scope of what I claim as new, and which claim is the following:

A faucet comprising a body provided with a longitudinal hole therethrough and having one end thereof terminating in a cylindrical inverted chamber concentric with the hole, threads formed on the exterior of the chamber wall, a second wall surrounding and spaced from the chamber wall to provide a channeled guideway and said second wall having threads formed on the exterior thereof, a ball valve adapted to be received in the chamber to form a closure for the said hole, a nozzle member having one end enlarged and formed to be received in the channeled guideway and engage the threads on the wall of the chamber, spider arms cast in said nozzle and terminating in a cupped chair for the ball valve, a threaded gland adapted for engagement with said second wall and having a bore to receive the said enlarged end of the nozzle member, the said gland adapted to retain and compress packing against the cylindrical surface of the enlarged end of the nozzle, and a handle carried by the nozzle member to turn the same whereby the enlarged end of the nozzle will travel vertically in the channeled guideway and likewise the ball valve in the chamber to open and close the hole in the body.

In testimony whereof, I affix my signature.

GUSTAV THALER.